United States Patent
Galmarini

(10) Patent No.: US 12,330,287 B2
(45) Date of Patent: Jun. 17, 2025

(54) STAND FOR MOWER CUTTING UNIT

(71) Applicant: David Richard Galmarini, Columbia Station, OH (US)

(72) Inventor: David Richard Galmarini, Columbia Station, OH (US)

(73) Assignee: GALMO ENTERPRISE LLC, Columbia Station, OH (US)

( * ) Notice: Subject to any disclaimer, the term of this patent is extended or adjusted under 35 U.S.C. 154(b) by 475 days.

(21) Appl. No.: 17/032,352

(22) Filed: Sep. 25, 2020

(65) Prior Publication Data

US 2021/0283765 A1     Sep. 16, 2021

Related U.S. Application Data

(60) Provisional application No. 62/907,680, filed on Sep. 29, 2019.

(51) Int. Cl.
    B60R 9/06       (2006.01)
    A01D 75/00      (2006.01)
    (Continued)

(52) U.S. Cl.
    CPC ......... B25H 1/0042 (2013.01); A01D 75/008 (2013.01); B25B 11/00 (2013.01);
    (Continued)

(58) Field of Classification Search
    CPC .......... B66F 7/00; B60R 9/06; B25H 1/0042; B25H 1/00; A01D 75/008; A01D 34/43; B25B 11/00; F16M 11/22
    (Continued)

(56) References Cited

U.S. PATENT DOCUMENTS

| | | | | |
|---|---|---|---|---|
| 2,895,729 A * | 7/1959 | Sanders | ............... | B25H 1/0007 248/176.1 |
| 4,406,384 A * | 9/1983 | Schantz | ................... | B60R 9/06 224/508 |
| 4,635,334 A * | 1/1987 | Diaz | ..................... | B25B 27/304 269/11 |
| 4,648,583 A * | 3/1987 | Greene | ................... | B66F 13/00 254/133 R |

(Continued)

FOREIGN PATENT DOCUMENTS

DE     19854731 A1 *   5/2000

OTHER PUBLICATIONS

Kernel Lawn Mower Lift Jack; found at: https://www.redlinestands.com/catalog/shop-equipment-c-327/general-shop-equipment-c-327_335/engine-stands-c-327_335_174/discontinued-kernel-lawn-mower-lift-jack-stand-p-815 (Year: 2024).*

Primary Examiner — Mahdi H Nejad

(57) ABSTRACT

A stand or fixture for supporting a mower cutting unit having a base frame with side members interconnected with at least 2 cross members. A cradle supports stable engagement with a roller of a mower cutting unit, and is secured to and extends upward from and between the side members. The cradle is parallel to the cross members, and positioned above the side members, supported on and secured to riser members. Each of the riser members is secured to a side member. A support member is adjustably secured at a desired location between cross members, and has a top portion extending upwardly away from the base frame, and above the cradle. The support member includes aligned openings above the cradle for receiving and securing a support pin supporting a support chain for engaging and suspending the mower cutting unit supported within the cradle, for accessing components of the mower cutting unit for service.

5 Claims, 4 Drawing Sheets

(51) Int. Cl.
*A01D 91/00* (2006.01)
*B25B 11/00* (2006.01)
*B25H 1/00* (2006.01)
*B66F 7/28* (2006.01)
*F16M 11/22* (2006.01)
*A01D 101/00* (2006.01)
*B66F 5/02* (2006.01)

(52) U.S. Cl.
CPC ............... *B60R 9/06* (2013.01); *F16M 11/22* (2013.01); *A01D 2101/00* (2013.01); *B66F 5/02* (2013.01); *B66F 7/28* (2013.01)

(58) Field of Classification Search
USPC ............... 269/902, 17; 254/2 B, 133 R, 134; 224/521
See application file for complete search history.

(56) References Cited

U.S. PATENT DOCUMENTS

| | | | |
|---|---|---|---|
| 7,823,861 B2* | 11/2010 | Krug | B66F 7/02 254/133 R |
| 8,448,920 B2* | 5/2013 | Krug | B66F 5/02 254/4 B |
| 10,974,777 B1* | 4/2021 | Ackerman | B62D 43/02 |
| 10,974,938 B2* | 4/2021 | Fenner | B60P 3/125 |
| 2002/0157369 A1* | 10/2002 | Fontanes, II | A01D 34/001 56/16.7 |
| 2004/0232184 A1* | 11/2004 | Moen | B60R 9/06 224/521 |
| 2012/0228569 A1* | 9/2012 | Krug | B66F 5/02 254/133 R |
| 2020/0022852 A1* | 1/2020 | Costanza-Steady | A61G 3/0808 |

* cited by examiner

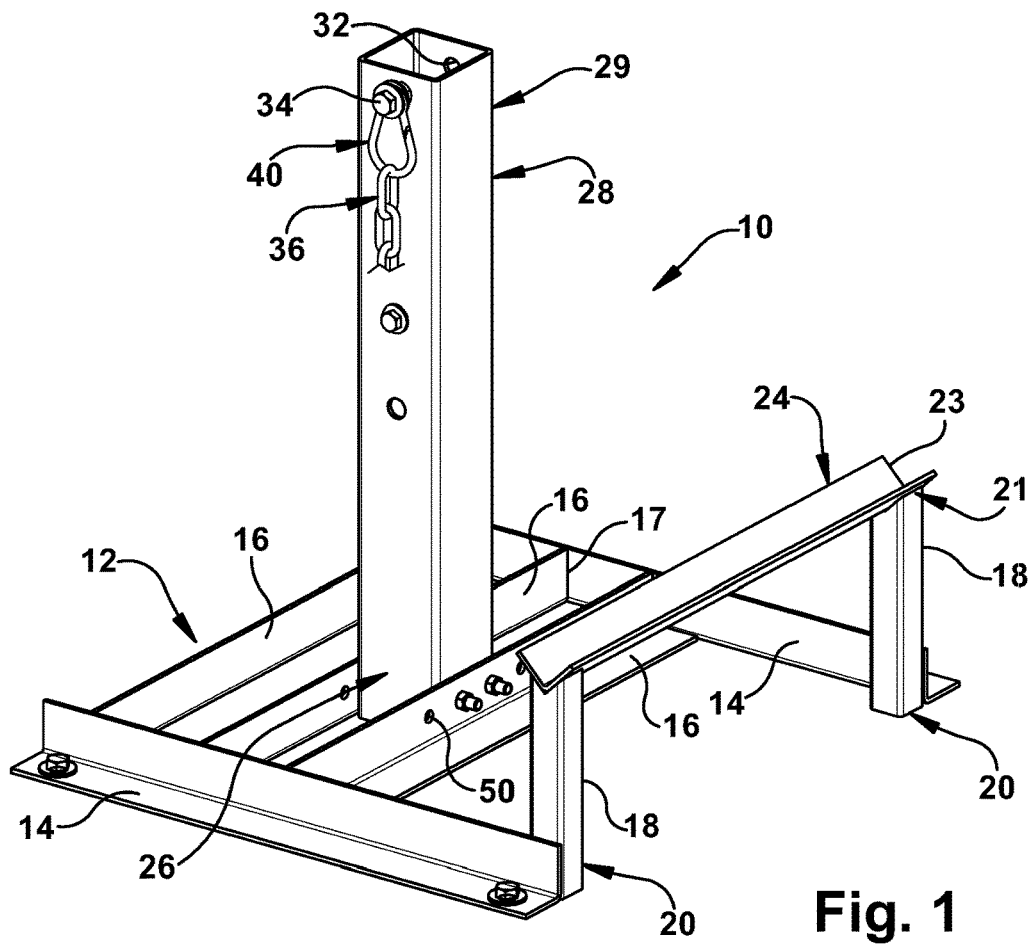
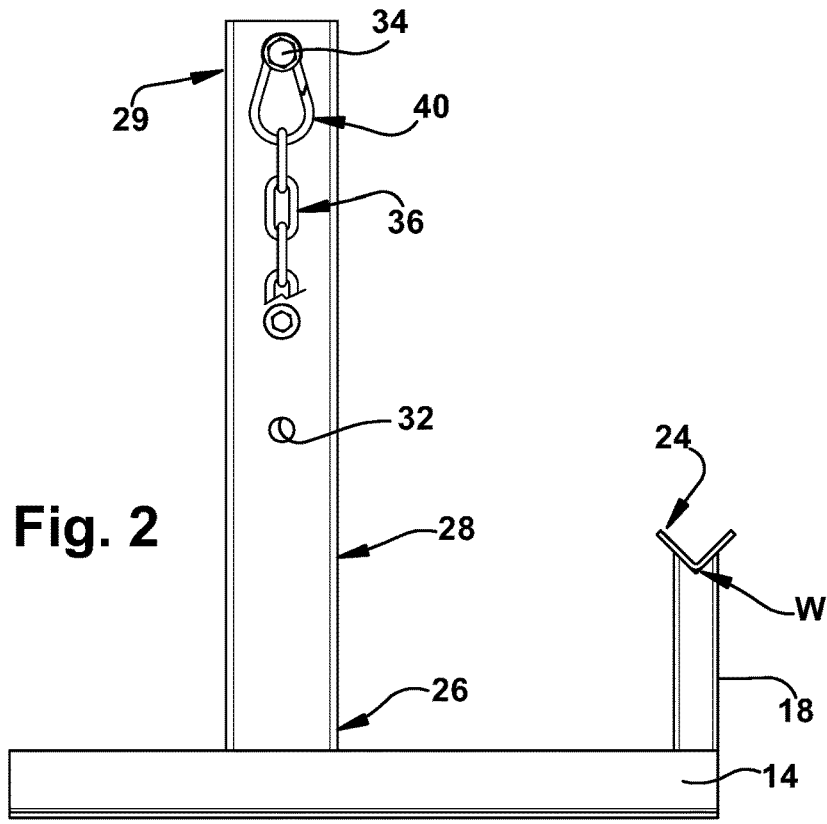

STAND FOR MOWER CUTTING UNIT

CROSS-REFERENCE TO RELATED APPLICATION

This application claims the benefit of U.S. Provisional Patent Application No. 62/907,680, filed Sep. 29, 2019, the entirety of which is incorporated herein by reference.

TECHNICAL FIELD

The present application relates to a fixture or stand for supporting a mower cutting unit for maintenance service or repair.

BACKGROUND

Turf mowers, and in particular reel mowers, are typically used for the maintenance of formal turf areas, such as golf fairways, tees and greens, and also for mowing elite sports fields and manicured turf areas. Reel mowers are manufactured in a variety of configurations, but most make use of one or more reel mower cutting units. Reel mower cutting units comprise several main components: a reel, which has several helix shaped blades, mounted to a rotating center shaft; a frame, which supports front and rear rollers, a bed bar assembly, and the reel and its drive mechanism; and a bed knife, which is attached to the bed bar assembly and adjustable with respect to the reel.

Reel mower cutting units cut grass using a shearing action, similar to the cutting action of scissors, as the rotating helix blades of the reel pass over the fixed bed knife. As a result, the reel blades and bed knife must be properly positioned with respect to one another, and sharp. Performance of the necessary position adjustments and sharpening of the reel mower cutting unit is required regular maintenance. Failure to perform the necessary maintenance may result in the poor appearance of the grass, as well as deterioration in the health of the grass.

Manufacturers of such specialized or precision mowing equipment, generally recommend that reel mower cutting units receive position adjustment and sharpening maintenance prior to each daily mowing. Providing such maintenance on a frequent basis means frequent removal of the reel mower cutting units from the mower. After removal, a cutting unit may be placed on a work bench for the necessary service. Because a cutting unit has both a front and rear roller, it may roll easily when placed on the work bench, and needs to be blocked for improved stability and safety. Equipment manufacturers recommend that a cutting unit be secured for safety prior to performing any service, and often suggest propping up the unit on wooden blocks. Supporting the reel mower cutting unit on blocks may not provide the desired stability during service or when tightening or loosening fasteners on the unit. There is a need for an improved device for better supporting reel mower cutting units during regular maintenance.

SUMMARY

An improved fixture to aid mower technicians in the repair and maintenance of various manufactured mower cutting units by supporting a cutting unit during such service is provided. The fixture is a stand for a reel mower cutting unit having a base frame for secure attachment to a horizontal work bench or other work surface. The base frame includes two opposite side members, and at least two intermediate cross members interconnected with the side members in spaced parallel relationship. Two vertical riser members are also interconnected with the side members, where the bottom of one riser member is secured to each side member, and is spaced from the cross members. The ends of a cross piece or cradle are secured between the tops of each riser member.

When a mower cutting unit is positioned on the stand for service, one of either the front or rear rollers of the mower cutting unit rests securely within the cradle, and provides a first point of engagement with the stand. A bottom portion of a rear support member is engaged and secured by fasteners between the two cross members, and extends upwardly from the base frame, such that a top portion of the rear support member is positioned above the cradle. The intermediate cross members are provided with aligned openings formed in each of the cross members at various spaced positions enabling the rear support member to be secured via fasteners at a one of several desired horizontal locations along the cross members.

When positioned at the desired horizontal location along and between the cross members, the rear support member enables a surface of the mower cutting unit on an alternate side from the roller engaged within the cradle, to be leaned against the vertical rear support member, and provides a second point of engagement of the mower cutting unit with the stand. In this more stable position, with the roller resting or sitting in the cradle and the mower cutting unit leaned or resting against the rear support member, aspects of the underside of the mower cutting unit requiring adjustment or sharpening are readily accessible for a technician to safely provide the necessary service. With the front or rear roller sitting in the cradle or saddle, and the mower cutting unit leaning on the rear support member, front facing or back lapping maintenance tasks, for example, may be readily performed Aligned openings are also provided through the rear support member to enable engagement of a support pin or fastener through the rear support member at one of several desired vertical positions. When positioned at the desired vertical height in the rear support member, the support pin may be used to engage and secure one end of a support chain or tether. A hook or other attachment may be secured on the other end of the chain for attachment to the mower cutting unit.

With the roller resting or sitting in the cradle, the mower cutting unit can be rotated forward and connected to the hook end of the chain, such that the mower unit is suspended from the rear support member using the adjustable support chain. In this hanging or "mow" position, the underside of the mower cutting unit may be more safely accessed by a technician for adjustment, sharpening or to measure the position or cut of the reel in a "true" or simulated mounted position. With the rear roller sitting in the cradle or saddle, and the mower cutting unit rotated forward to the mow position, the clearances between the reel and bed knife may be adjusted to the desired positions. Additionally, repair, rebuilding or replacement of rollers, reels, reel bearings, bed knifes and bed bars may also be readily accomplished.

The reel stand or fixture may be removably secured to a work bench or other horizontal work surface using fasteners clamps or other securing techniques. Once securely attached to the work surface, a technician may mount a mower cutting unit on the reel stand to perform a wide variety of possible maintenance, service or repairs.

BRIEF DESCRIPTION OF THE DRAWINGS

FIG. 1 illustrates a perspective, partially schematic view of the reel stand of this application.

FIG. 2 illustrates a left side view of the reel stand of FIG. 1.

DETAILED DESCRIPTION

Figure 3:
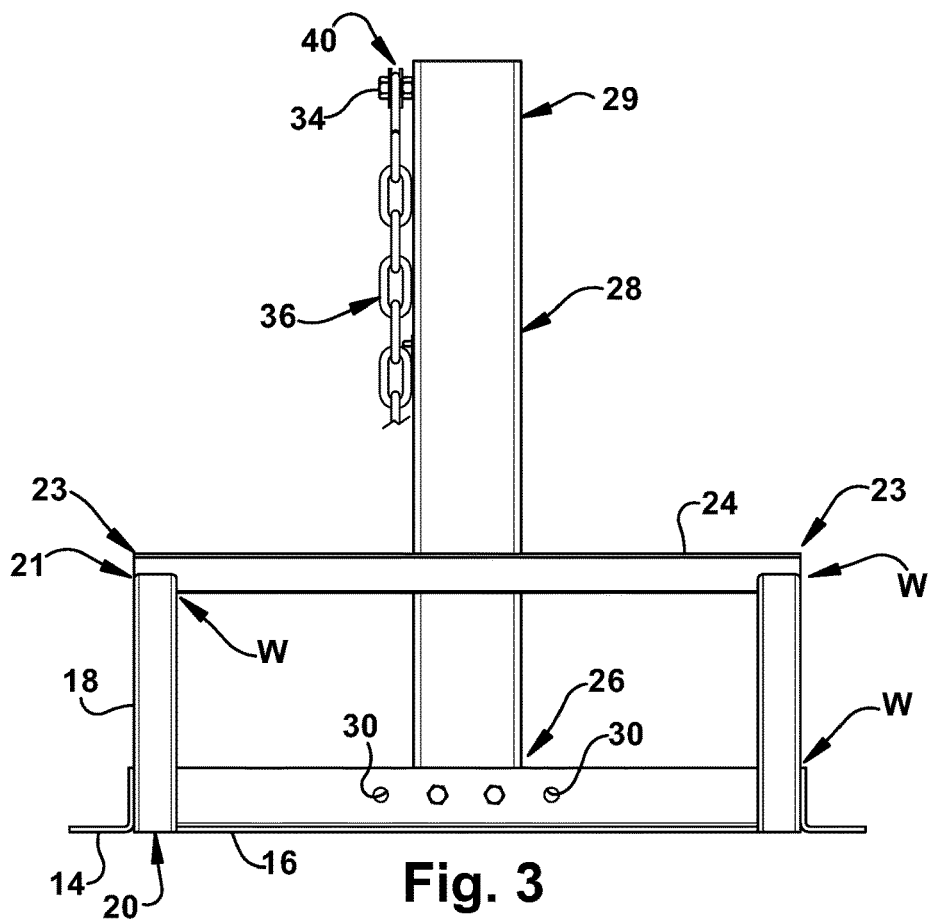
FIG. 3 illustrates a rear view of the reel stand of FIG. 1.
Figure 4:
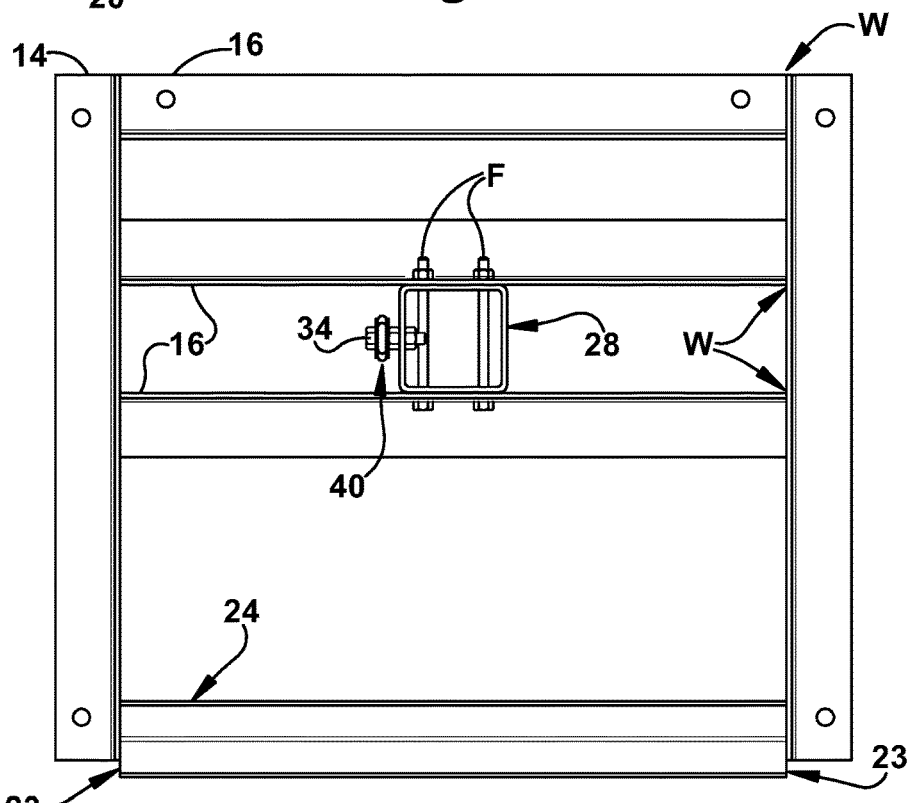
FIG. 4 illustrates a top view of the reel stand of FIG. 1.
Figure 7:
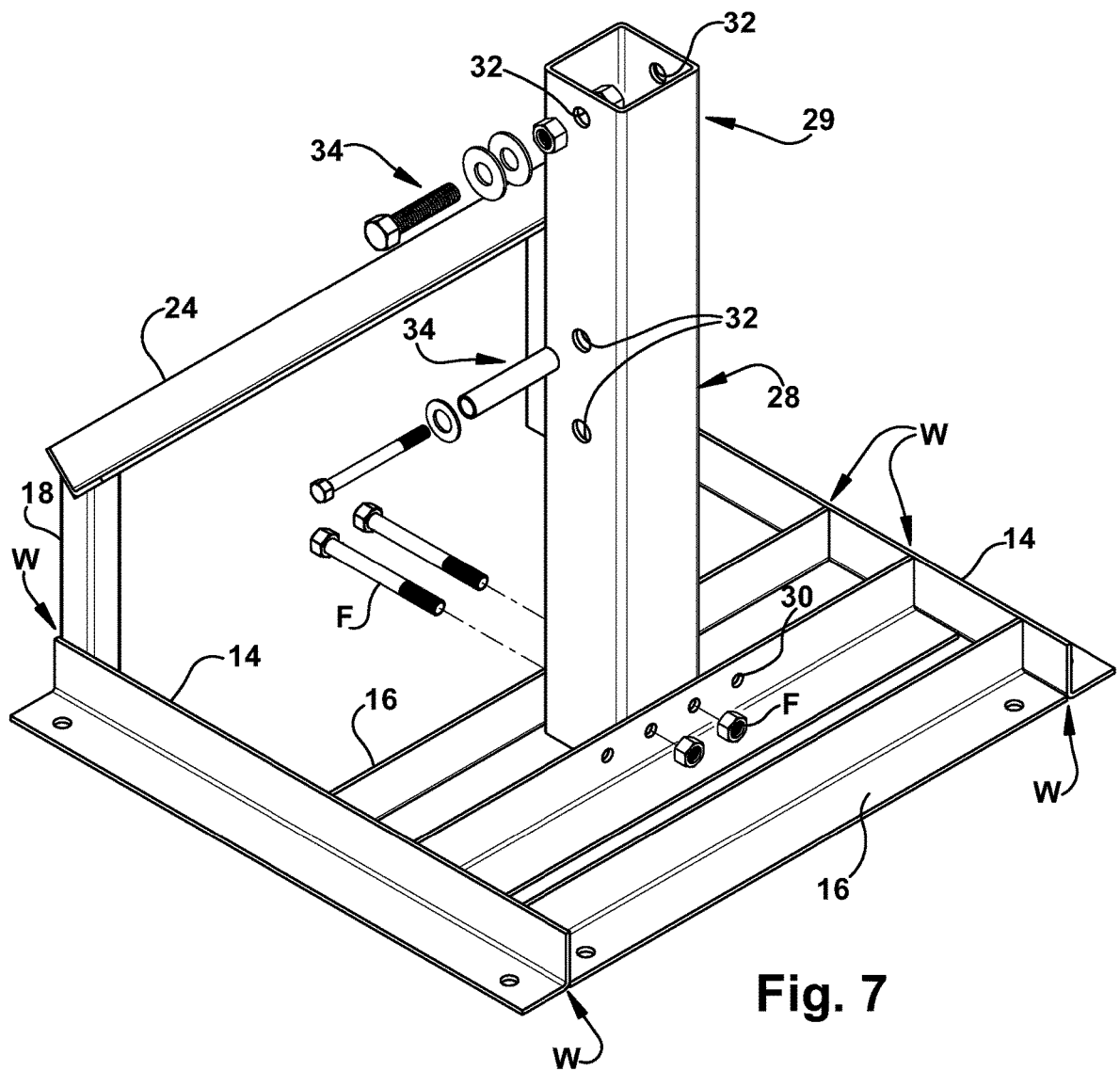
FIG. 7 schematically illustrates a rear perspective exploded view of the various fasteners used to secure components of the stand in position.

This application provides a stand or fixture for holding a reel mower cutting unit in a stable position for performing maintenance, service or repairs. The improved stand 10 aids mower technicians during repair and maintenance of various manufactured mower cutting units by supporting the cutting unit during such service. As shown in FIG. 7, the stand 10 includes a base frame 12 that is securely attached to a horizontal work bench WB or other work surface. The stand is preferably removably secured to a work bench using fasteners F, as schematically shown, or clamps or other securing techniques. As best shown in FIGS. 1, 4 and 7, the base frame 12 includes two opposite side members 14, and at least two intermediate cross members 16. The side members 14 are preferably 1.5 inch by 1.5 inch angle irons, or may be lengths of steel, bars, tubing or other appropriate metal material, sufficient to support the weight of a mower cutting unit, and are approximately 16 inches in length.

As shown in FIGS. 1, 4, 5 and 7, three cross members 16 are provided, and are shown interconnected with the side members 14 in spaced and parallel relationship. The cross members 16 are preferably 1.5 inch by 1.5 inch angle irons of approximately 15.5 inches in length, and likewise may be lengths of steel, bar stock, tubing or other appropriate metal material. The ends 17 of the cross members 16 are preferably welded to the side members 14 in the desired positions spaced along the side members. Two vertical riser members 18 are also interconnected with the side members 14, preferably by welding, although drilled holes and fasteners may be used. The riser members 18 are preferably 1 inch by 1 inch square metal tube stock, approximately 6 inches long. The bottom 20 of each riser member 18 is secured preferably by welding at the end of each side member 14, spaced from the cross members 16.

As shown in FIGS. 1-2 and 5-7, a cradle 24 is provided for engagement with a roller RR, FR of the mower cutting unit. The ends 23 of the cradle 24 are secured by welding W between the tops 21 of each riser member 18. As shown in FIGS. 1-2, the tops 21 of the riser members 18 are configured, shown with a v-shape, to receive a mating configuration of the supported cradle 24. The cradle 24, illustrated as a 1 inch by 1 inch angle iron, preferably of steel or other appropriate metal material sufficient to support the weight of a mower cutting unit, is approximately the same length as the cross members 16, or 15.5 inches. The cradle 24 preferably has a v-shape in cross section for engaging and supporting a roller of the mower cutting unit.

FIGS. 1, 3-4 and 7 illustrate that the bottom portion 26 of a rear support member 28 is engaged and secured by fasteners F between 2 cross members 16. The rear support member 28 extends upwardly from the base frame 12, such that a top portion 29 of the rear support member is positioned above the cradle 24. As shown, at least 2 of the cross members 16 are drilled with spaced aligned holes 30 through the cross members to enable adjustable attachment of the rear support member 28 via fasteners F at various desired horizontal positions along the cross members. In the illustrated embodiment, left, center and right horizontal positions are permitted, with the rear support member 28 shown in the center horizontal position.

Once the stand 10 is securely attached to the work bench WB, and the mower cutting unit CU removed from the reel mower, the cutting unit may be positioned on the stand 10 for service with either the front or the rear roller FR, RR of the mower cutting unit resting within the cradle 24. Use of the rear support member 28 enables a surface S of the mower cutting unit on an alternate side from the roller engaged within the cradle, to be leaned against the vertical rear support member. In this position, with the roller resting or sitting, and not moving, in the cradle 24, and the mower cutting unit CU leaned or resting against the rear support member 28, aspects of the underside of the mower cutting unit CU requiring maintenance or repairs may be easily accessed to more safely provide the necessary service, such as front facing or back lapping maintenance tasks.

Figure 5:
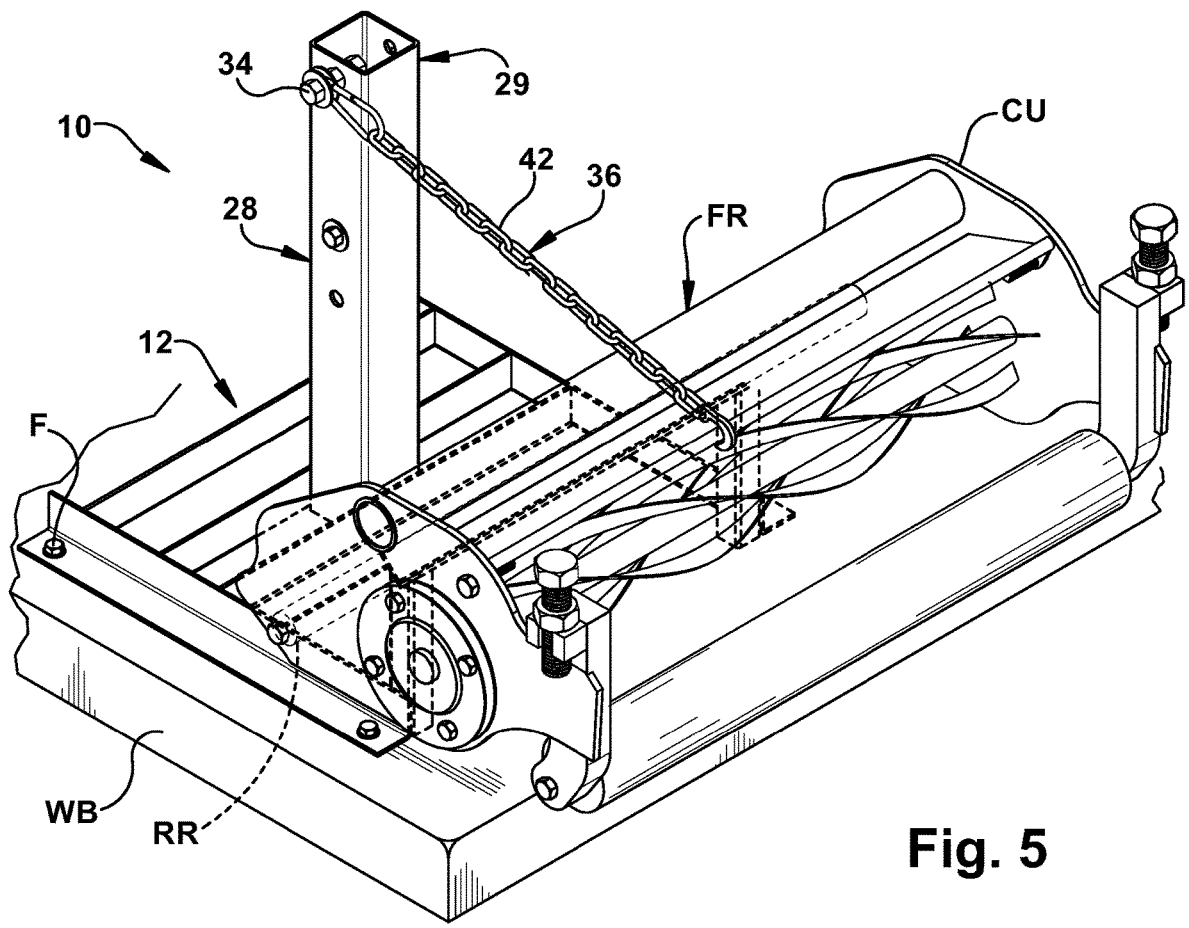
FIG. 5 schematically illustrates a perspective view of a mower cutting unit mounted on the reel stand of FIG. 1 and suspended from a chain to demonstrate a hanging position.
Figure 6:
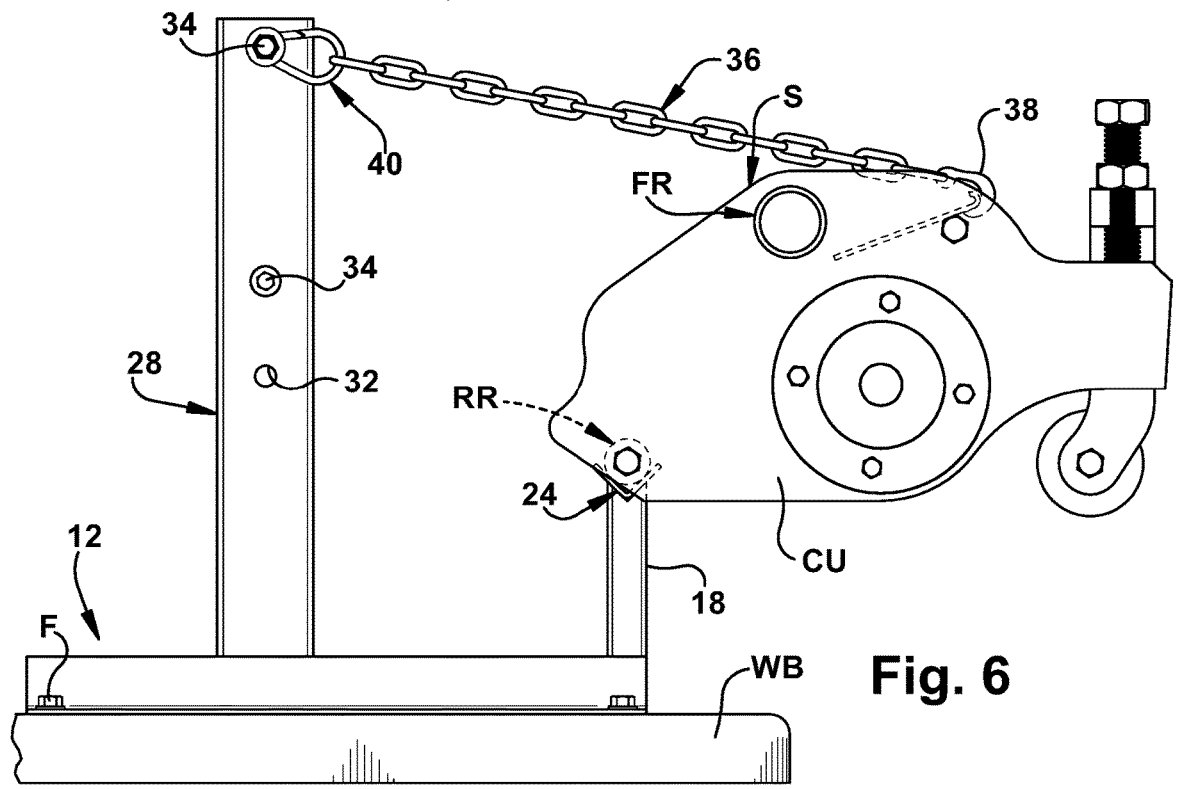
FIG. 6 schematically illustrates a left side view of the hanging mower cutting unit mounted on the reel stand as in FIG. 5.

To access alternate aspects of the mower cutting unit CU, additional hanging positions may also be used with the stand 10. As shown in FIGS. 1, 3-4 and 7, aligned openings 32 are also provided through the rear support member 28 to engage and secure a support pin or fastener 34 through the rear support member at one of several desired vertical positions. By engaging the support pin 34 at the desired vertical height through the rear support member 28, one end of an adjustable support chain or tether 36 may be suspended, as illustrated. A hook 38 or other attachment mechanism is provided on the other end of the support chain 36 for supporting the mower cutting unit CU. In the illustrated embodiment, the end of the support chain 36 attached to the support pin 34 includes, for example, a heavy duty stainless steel carabineer or hook 40, which may also include a spring biased clip or link. Using a carabineer 40 with a clip, the link of the support chain 36 engaged with the carabineer may be adjusted to shorten or lengthen the support chain between the rear support member and the hook 38, so that the mower cutting unit is suspended in the desired position. In FIGS. 5 and 6, the support chain 36 is extended to a maximum distance. By moving the carabineer 40 to engage a support chain link 42 (or any intermediate support chain link), the support chain 36 is shorter, and the mower cutting unit is rotated up and toward the rear support member in the direction of the arrow of FIG. 6, such that the other areas, for example, a bottom area of the mower cutting unit is more accessible for service.

With the roller RR, FR resting or sitting in the cradle 24, the mower cutting unit CU can be rotated to a variety of suspended positions from the rear support member 28 by adjusting the adjustable support chain 36. In a "mow" position, the cut of the reel in a "true" or simulated mounted position may be measured. The clearances between the reel and bed knife may be also be adjusted to the desired positions, as well as additional rebuilding or replacement of rollers, reels, reel bearings, bed knifes and bed bars.

As various changes could be made in the above equipment and process without departing from the scope of the invention, it is intended that all matter contained in the above description and shown in the accompanying figures shall be interpreted as illustrative and not in a limiting sense.

I claim:

1. A maintenance stand attached to a surface of a workbench for supporting a mower cutting unit comprising,
   a base frame having at least two side members interconnected with at least two cross members;
   a cradle having a v-shaped cross sectional configuration for supporting engagement with a roller of the mower cutting unit, the cradle is secured to and extending upwardly with respect to and between the at least two side members, spaced from and parallel to the at least two cross members, and is positioned above the at least two side members, supported on, secured to and extending between the at least two riser members, and each of the riser members is secured to a respective side member of the at least two side members of the base frame; and
   a support member secured at a desired location between the at least two cross members to support engagement with the roller of the mower cutting unit on a surface spaced from the mower cutting unit roller engaged within the cradle, and the support member having a top extending upwardly away from the base frame, such that the top of the support member is positioned above the cradle and includes aligned openings positioned above the cradle, and the aligned openings are adapted to receive and secure a support pin therethrough, and the support pin engaged through the aligned openings supports a support chain for engagement with and suspension of the mower cutting unit supported within the cradle, for accessing components of the mower cutting unit for service, and wherein the position of the support member is adjustable horizontally relative to the at least two cross members.

2. The maintenance stand attached to a surface of a workbench for supporting a mower cutting unit of claim 1, wherein a length of the support chain is adjustable for positioning the suspended mower cutting unit in a desired position for accessing different components of the mower cutting unit for service.

3. The maintenance stand attached to a surface of a workbench for supporting a mower cutting unit of claim 2, wherein the support chain is adjustable to position the suspended mower cutting unit in a mow position to simulate the position of the mower cutting unit during use.

4. A maintenance stand for attachment to a work surface and supporting a mower cutting unit comprising,
   a base frame having side members interconnected with at least two cross members;
   a cradle with a v-shaped cross sectional configuration for supporting stable engagement with a roller of the mower cutting unit, the cradle secured to and extending upwardly with respect to and between the side members, and spaced from and parallel to the at least two cross members and positioned above the side members; the cradle supported on, secured to and extending between the at least two riser members, and each of the riser members is secured to a respective side member of the base frame;
   a support member, adjustably secured at a desired location between the at least two cross members, including aligned openings positioned for alignment with mating aligned openings positioned through and along the at least two cross members for adjustable positioning of the support member in a desired position intermediate the at least two cross members, and the support member is secured in the desired position between the at least two cross members by engagement of a fastener through the aligned openings of both the support member and the at least two cross members, and having a top extending upwardly away from the base frame, such that the top of the support member is positioned above the cradle; and
   wherein the support member includes aligned openings positioned above the cradle, and the aligned openings receive and secure a support pin therethrough for supporting an adjustable tether for engagement with and suspension of a mower cutting unit supported within the cradle, for accessing components of the mower cutting unit for service, and wherein the position of the support member is adjustable horizontally relative to the at least two cross members.

5. The maintenance stand for attachment to a work surface and supporting a mower cutting unit of claim 4, wherein the adjustable tether is adjustable to different lengths for positioning the suspended mower cutting unit in desired positions for accessing different components of the mower cutting unit for service.

\* \* \* \* \*